(12) United States Patent
Eshima et al.

(10) Patent No.: US 9,850,861 B2
(45) Date of Patent: Dec. 26, 2017

(54) VEHICLE INCLUDING AIR INTAKE

(71) Applicant: YAMAHA HATSUDOKI KABUSHIKI KAISHA, Iwata-shi, Shizuoka (JP)

(72) Inventors: Makoto Eshima, Shizuoka (JP); Takashi Ashida, Shizuoka (JP); Atsushi Murashima, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/166,424

(22) Filed: May 27, 2016

(65) Prior Publication Data

US 2016/0348619 A1     Dec. 1, 2016

(30) Foreign Application Priority Data

May 29, 2015   (JP) .................................. 2015-109927

(51) Int. Cl.

| | |
|---|---|
| *F02M 35/10* | (2006.01) |
| *F02B 33/44* | (2006.01) |
| *F02B 33/40* | (2006.01) |
| *F02M 35/16* | (2006.01) |
| *B60K 13/02* | (2006.01) |

(52) U.S. Cl.
CPC ....... *F02M 35/10163* (2013.01); *B60K 13/02* (2013.01); *F02B 33/40* (2013.01); *F02B 33/44* (2013.01); *F02M 35/10072* (2013.01); *F02M 35/10078* (2013.01); *F02M 35/10085* (2013.01); *F02M 35/10111* (2013.01); *F02M 35/10144* (2013.01); *F02M 35/10255* (2013.01); *F02M 35/162* (2013.01); *B60Y 2200/252* (2013.01); *F02M 35/10216* (2013.01); *Y02T 10/144* (2013.01)

(58) Field of Classification Search
CPC ....... F02M 35/10072; F02M 35/10078; F02M 35/10085; F02M 35/10111; F02M 35/10144; F02M 35/10163; F02M 35/10216; F02M 35/10255; F02M 35/162; F02B 33/40; F02B 33/44; F02D 9/02; B60K 13/02; B60Y 2200/252
See application file for complete search history.

(56) References Cited

U.S. PATENT DOCUMENTS

| | | | | |
|---|---|---|---|---|
| 5,657,727 A | * | 8/1997 | Uchida | .................. F02B 27/00 123/184.34 |
| 5,908,017 A | | 6/1999 | Kaneko | |

FOREIGN PATENT DOCUMENTS

| | | | | |
|---|---|---|---|---|
| JP | 5752605 B2 | * | 7/2015 | ............. F02D 9/109 |
| WO | 2011/078343 A1 | | 6/2011 | |

* cited by examiner

*Primary Examiner* — Audrey K Bradley
(74) *Attorney, Agent, or Firm* — Keating and Bennett, LLP

(57) ABSTRACT

A snowmobile includes an engine including an engine head including a cylinder head, a supercharger, an intake manifold, throttle bodies, first joints that connect the intake manifold to the throttle bodies, second joints that connect the throttle bodies to the cylinder head, and a restrictor that connects the engine head to the first joints. The restrictor includes an engaging member that fits into grooves of the first joints, and connectors that connect the engaging member and the engine head to each other. A steering shaft is inserted between two mutually adjacent first joints which have a distance from each other greater than a distance between the other two mutually adjacent first joints.

14 Claims, 14 Drawing Sheets

F I G. 1 2
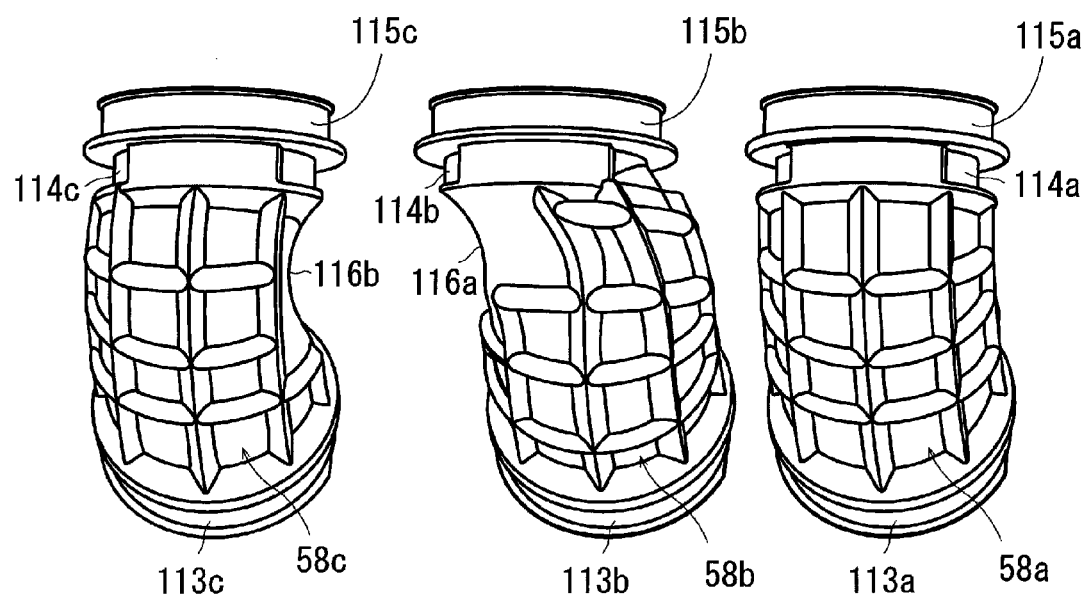

F I G. 1 4
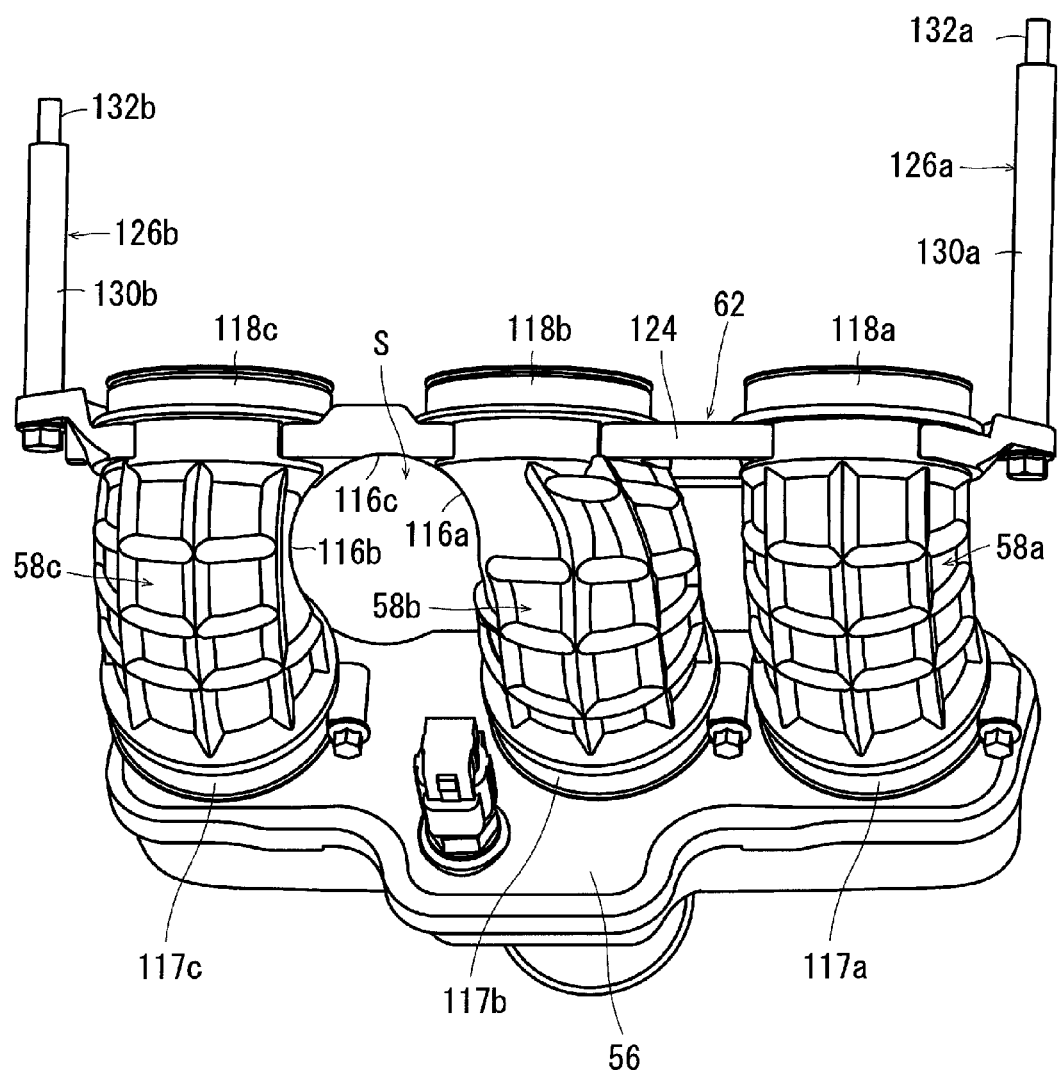

VEHICLE INCLUDING AIR INTAKE

BACKGROUND OF THE INVENTION

Field of the Invention

The present invention relates to a vehicle, and more specifically, to a vehicle including an engine equipped with a supercharger and a throttle body.

Description of the Related Art

Conventionally, in a vehicle such as a motorcycle, a throttle body is fixed to a cylinder head of an engine via a rubber throttle holder. If such an engine includes a supercharger, however, the rubber throttle holder may detach from the cylinder head because supercharging increases the pressure inside an air intake passage. In an attempt to solve this problem, WO 2011/078343 discloses a mounting structure of a throttle body in an engine equipped with a supercharger in which the throttle body is fixed to a chamber case, and the chamber case is fixed to a cylinder head so that a throttle holder on a downstream side of the throttle body will not be detached therefrom.

WO 2011/078343 describes a motorcycle and intends to prevent members on a downstream side of the throttle body from detaching. However, in engines which are used in other vehicles, there are cases in which an air intake tube on an upstream side of the throttle body includes an elastic air intake passage structure. In this case, the air intake tube on the upstream side of the throttle body is likely to be detached.

SUMMARY OF THE INVENTION

Preferred embodiments of the present invention provide a vehicle that is able to prevent members on an upstream side of a throttle body from detaching from the engine.

According to a preferred embodiment of the present invention, a vehicle includes an engine including an engine head including a cylinder head and a head cover disposed on the cylinder head, a throttle body that supplies air to the cylinder head, a supercharger, an intake manifold that is supplied with compressed air from the supercharger, a first joint that connects the intake manifold and the throttle body to each other, and a restrictor that connects the engine head and the first joint to restrict relative movement of the first joint with respect to the engine head.

According to a preferred embodiment of the present invention, the restrictor restricts movement of the first joint and, therefore, even if an air intake pressure on an upstream side of the throttle body becomes high, it is possible to prevent the first joint, which is located on the upstream side of the throttle body, from detaching from the throttle body. In other words, it is possible to prevent structural elements that are disposed on an upstream side of the throttle body from detaching. Since it is possible to prevent the first joint from detaching, there is no need to use a throttle body having a special structure, i.e., a conventional throttle body for a naturally aspirated engine which is not equipped with a supercharger is easily used in an engine which is equipped with a supercharger.

Preferably, the first joint includes an elastic member. In this case, even if the first joint is subjected to an external force, it is possible to absorb the external force and to prevent the first joint from detaching more reliably.

Further preferably, the first joint includes a groove in an outer circumferential surface thereof, and the restrictor includes an engaging member which fits into the groove, and a connector that connects the engaging member and the engine head to each other. In this case, the restrictor that restricts axial movement of the first joint is made easily. Also, the connector connects the engaging member and the engine head in such a manner that the throttle body is sandwiched by the engaging member which is fitted in the groove of the first joint and the engine head. This makes it possible to fix the throttle body to prevent the throttle body from detaching due to a high pressure.

Further, preferably, the groove preferably is C-shaped or substantially C-shaped in a circumferential direction of the outer circumferential surface of the first joint, and the engaging member includes a C-shaped or substantially C-shaped portion which fits into the groove. By using the above described arrangement in which the groove is C-shaped or substantially C-shaped and the engaging member includes a C-shaped or substantially C-shaped portion, i.e., an engaging member portion which is partially open while covering a portion of the first joint in a circumferential direction, it becomes possible to easily attach/detach the engaging member to/from the groove.

Preferably, the connector includes a collar between the engaging member and the engine head, and a bolt is inserted through the collar to connect the engaging member and the engine head to each other. In this case, the collar defines and functions as a spacer, which makes it possible to keep a constant distance between the engaging member and the engine head allowing easy connection between the engaging member and the engine head using the bolt.

Further preferably, the engine includes a plurality of cylinders, the first joint is provided for each of the plurality of cylinders, and the engaging member connects the plurality of the first joints to each other. In this case, one engaging member is fitted into the grooves of a plurality of first joints. Therefore, even in cases where there is a plurality of the first joints, only one engaging member is required. Also, by connecting the plurality of the first joints with a single engaging member, it becomes possible to maintain a consistent positional relationship of the plurality of first joints.

Further, preferably, the connector is provided on each of two laterally outer sides of the plurality of cylinders. In this case, since the connectors are on one and the other outer sides of the plurality of cylinders as a whole, and each of the connectors connects the engaging member and the engine head to each other, the restrictor restricts movement of the first joints more reliably, making it possible to prevent the first joints from detaching more reliably.

Preferably, the vehicle further includes a second joint that connects the cylinder head and the throttle body to each other and preferably includes an elastic member. In this case, it is possible to fix the cylinder head and the throttle body by the second joint which preferably includes an elastic member.

Further, preferably, the engine includes a plurality of cylinders, the first joint is provided for each of the plurality of cylinders, and the vehicle further includes a steering shaft inserted between two mutually adjacent first joints. In an arrangement in which an intake manifold is directly connected to the throttle body, and a steering shaft is inserted between the intake manifold and the throttle body, it is possible that the steering shaft cannot be inserted because there is not enough distance between two mutually adjacent bores in the intake manifold. However, by connecting the intake manifold and each throttle body by the first joint, it becomes possible to provide a space between two mutually adjacent first joints to insert the steering shaft. Thus, even in a design that the steering shaft is located between the intake manifold and the throttle body, it is possible to attach the steering shaft.

Preferably, the first joint includes an elastic member. In this case, the first joints have an increased freedom in their shape. This makes it easier to provide a space between two mutually adjacent first joints to insert the steering shaft making it easier to attach the steering shaft.

Further preferably, the engine includes at least three cylinders, and two mutually adjacent first joints between which the steering shaft is inserted are spaced by a distance from each other which is greater than a distance between the other two mutually adjacent first joints. In this case, the arrangement makes it easy to insert the steering shaft between two mutually adjacent first joints, and the location to insert the steering shaft is easily recognized.

According to a preferred embodiment of the present invention, the restrictor restricts movement of the first joints making it possible to prevent the first joints from detaching. Therefore, throttle bodies for non-supercharged engines may be used in common with engines equipped with superchargers. Therefore, preferred embodiments of the present invention are suitably applicable to a snowmobile which is equipped with a supercharger, for example.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 12 is a view showing the first joints.

FIG. 13A and FIG. 13B are views showing an engaging member, wherein FIG. 13A is a perspective view and FIG. 13B is a front view.

FIG. 14 is a view showing the first joints with the intake manifold and a restrictor attached thereto.

DETAILED DESCRIPTION OF THE PREFERRED EMBODIMENTS

Hereinafter, preferred embodiments of the present invention will be described with reference to the drawings. It is noted that the terms front and rear, right and left, up and down as used in the preferred embodiments of the present invention are determined from the driver's position on a seat 46 of a snowmobile 10, with the driver facing toward a steering handle 108.

Figure 1:
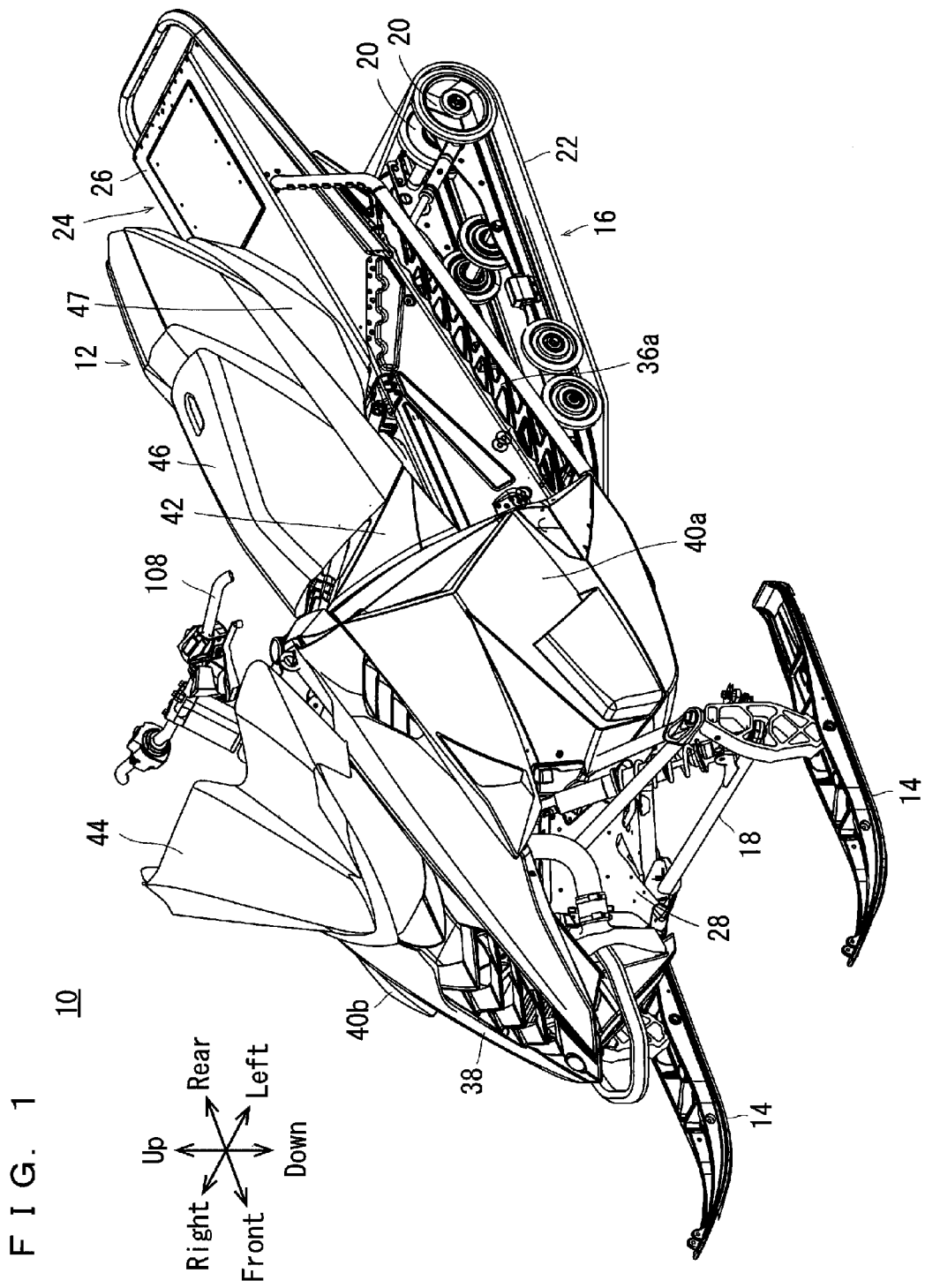
FIG. 1 is a perspective view of a snowmobile according to a preferred embodiment of the present invention.
Figure 2:
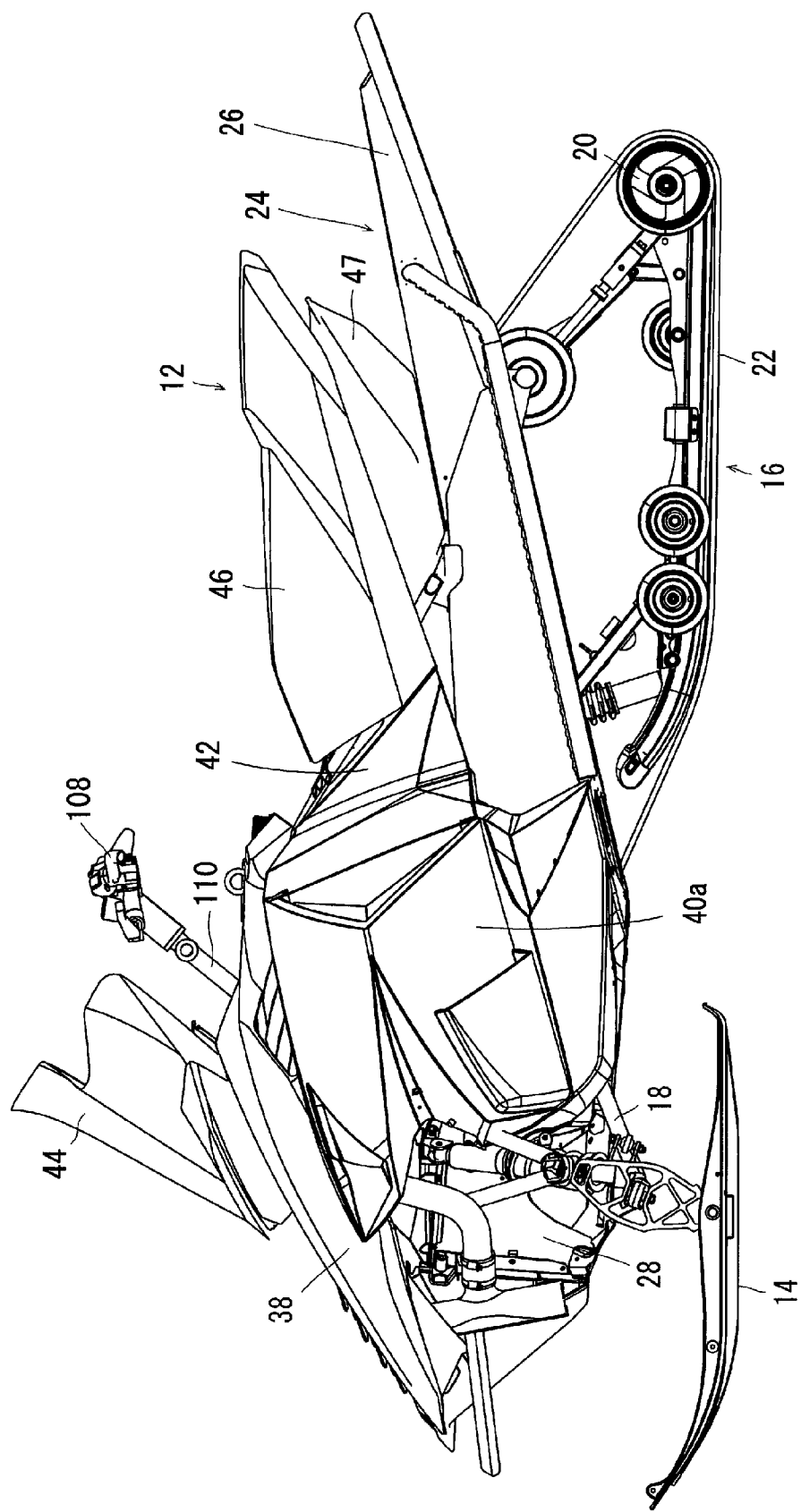
FIG. 2 is a side view of the left side of the snowmobile according to a preferred embodiment of the present invention.

Referring to FIG. 1 and FIG. 2, a snowmobile 10 is an example of a saddle type vehicle, and includes a main body 12, a pair of left and right skis 14, and a drive unit 16.

The pair of skis 14 are parallel or substantially parallel to each other with the main body 12 in between, and extend in a fore-aft direction. The pair of skis 14 are supported by a front portion of the main body 12 via left and right suspensions 18. Although FIG. 1 shows only the left suspension 18, there is the right suspension 18 on a right side.

The drive unit 16 is disposed below the main body 12. The drive unit 16 includes driving wheels (not shown), driven wheels 20, and track belts 22. The driving wheels are rotated by driving power supplied from a CVT 70 (to be described below). The track belts 22 are wound around the driving wheels and the driven wheels 20, and are driven in a circular manner as the driving wheels are rotated. The driven wheels 20 are driven in the circular rotation of the track belts 22.

Referring to FIG. 3 through FIG. 7, the main body 12 includes a frame 24. The frame 24 includes a platy main frame 26 extending in a fore-aft direction of the snowmobile 10; a front frame 28 at a front end of the main frame 26; and a supporting frame 30 on an upper surface of the main frame 26, at a more forward position than a center region of the main frame 26. The support frame 30 includes frame members 32a, 32b extending obliquely forward and upward from a center region in an upper surface of the main frame 26; frame members 32c, 32d extending upward from more forward positions than the frame members 32a, 32b on the upper surface of the main frame 26; frame members 32e, 32f extending obliquely rearward and upward from the front frame 28; and a connecting portion 34 connecting upper end portions of the frame members 32a through 32f. At a center region on a right side and a left side of the main frame 26, left and right footrests 36a, 36b extend in a fore-aft direction. The main frame 26 includes a lower surface that defines and functions as a ceiling surface of a track house (not illustrated) which houses the track belts 22.

Referring to FIG. 1 and FIG. 2, a front shroud 38 is disposed at a front portion of the main body 12; side shrouds 40a, 40b are disposed on two sides of the main body 12; and a rear shroud 42 connects the side shrouds 40a, 40b to each other. The front shroud 38, the side shrouds 40a, 40b, and the rear shroud 42 surround the support frame 30, and are attached to the frame 24. At an upper end portion of the front shroud 38, a wind shield 44 is provided. Above the main frame 26, a seat 46 extends rearward beyond the rear shroud 42 for a driver to sit. A fuel tank 47 is disposed between the main frame 26 and the seat 46.

In a space near the connecting portion 34 and surrounded by the main frame 26, the front shroud 38, the side shrouds 40a and 40b, and the rear shroud 42, there are disposed an engine 48, an air cleaner 50, a supercharger 52, an inter cooler 54, an intake manifold 56, first joints 58a through 58c, throttle bodies 60 (see FIG. 11), a restrictor 62 (see FIG. 14), second joints 64 (see FIG. 11), an exhaust manifold 66, a muffler 68, a CVT 70 and other components.

Figure 7:
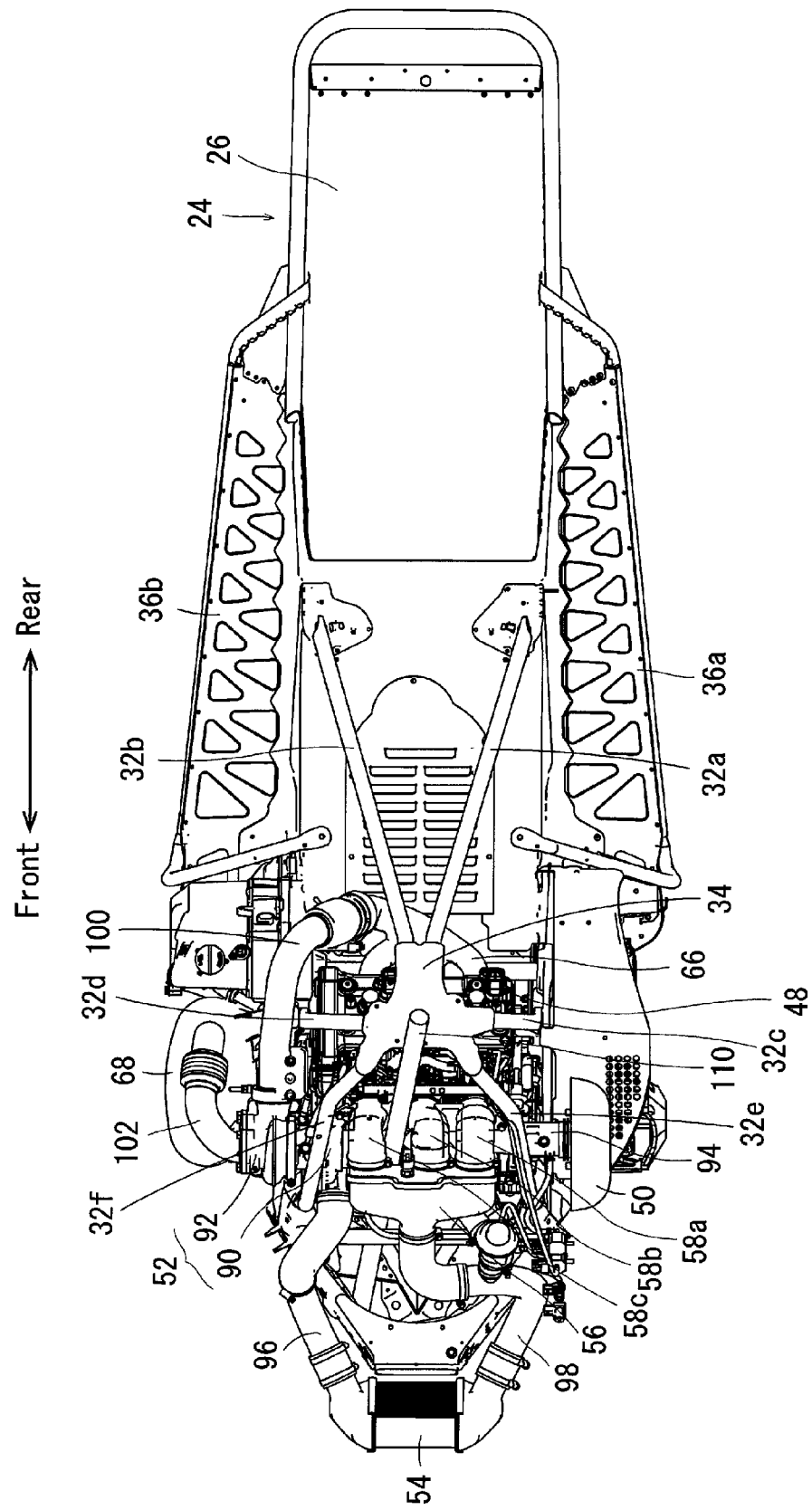
FIG. 7 is a plan view of the main body with the shroud removed.

The engine 48 is disposed on the main frame 26 at a more forward position than a center region of the main frame 26. Referring to FIG. 7, in a plan view of the snowmobile 10, the engine 48 overlaps the connecting portion 34.

Figure 8:
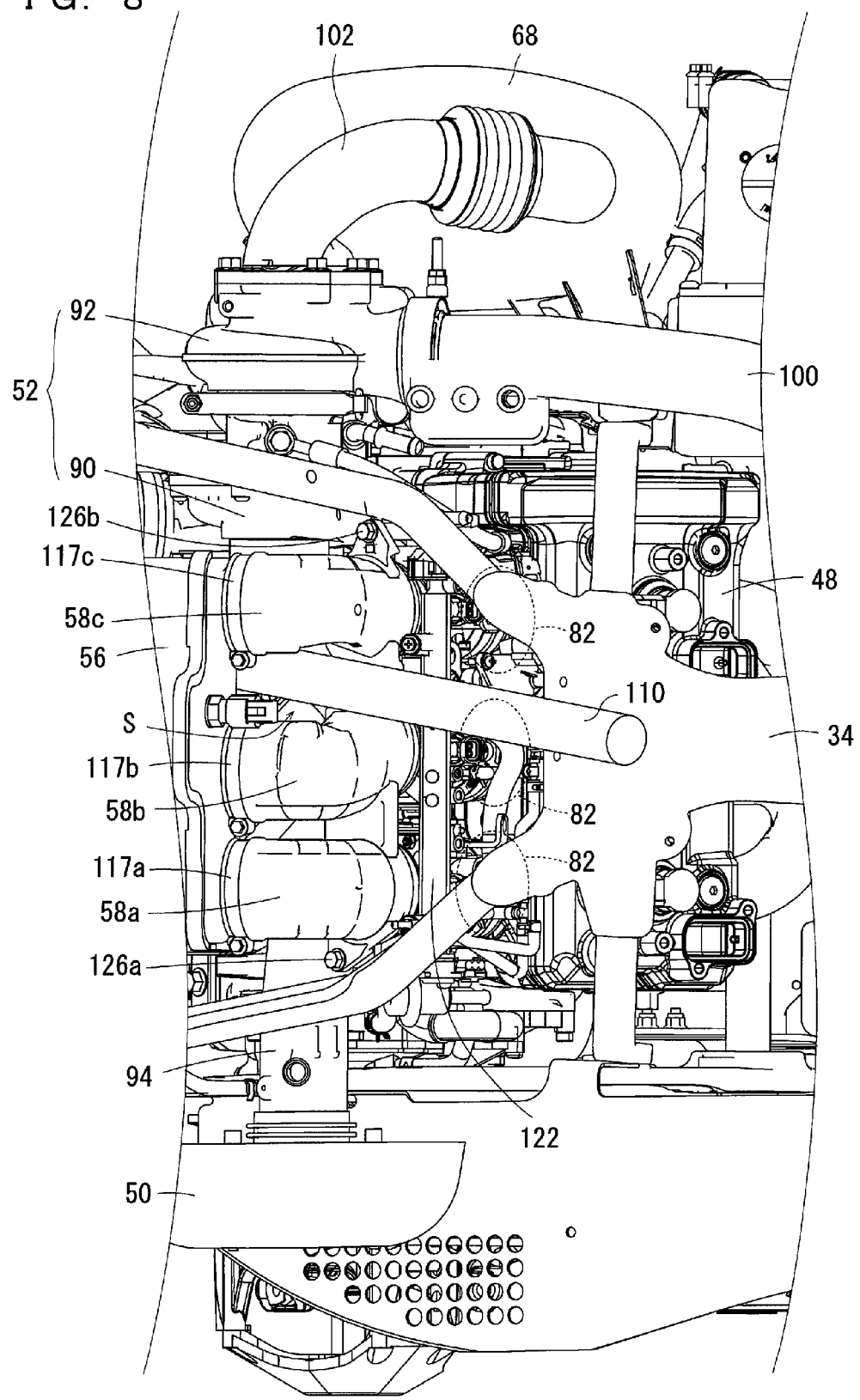
FIG. 8 is a plan view of an engine and the surroundings thereof.
Figure 9:
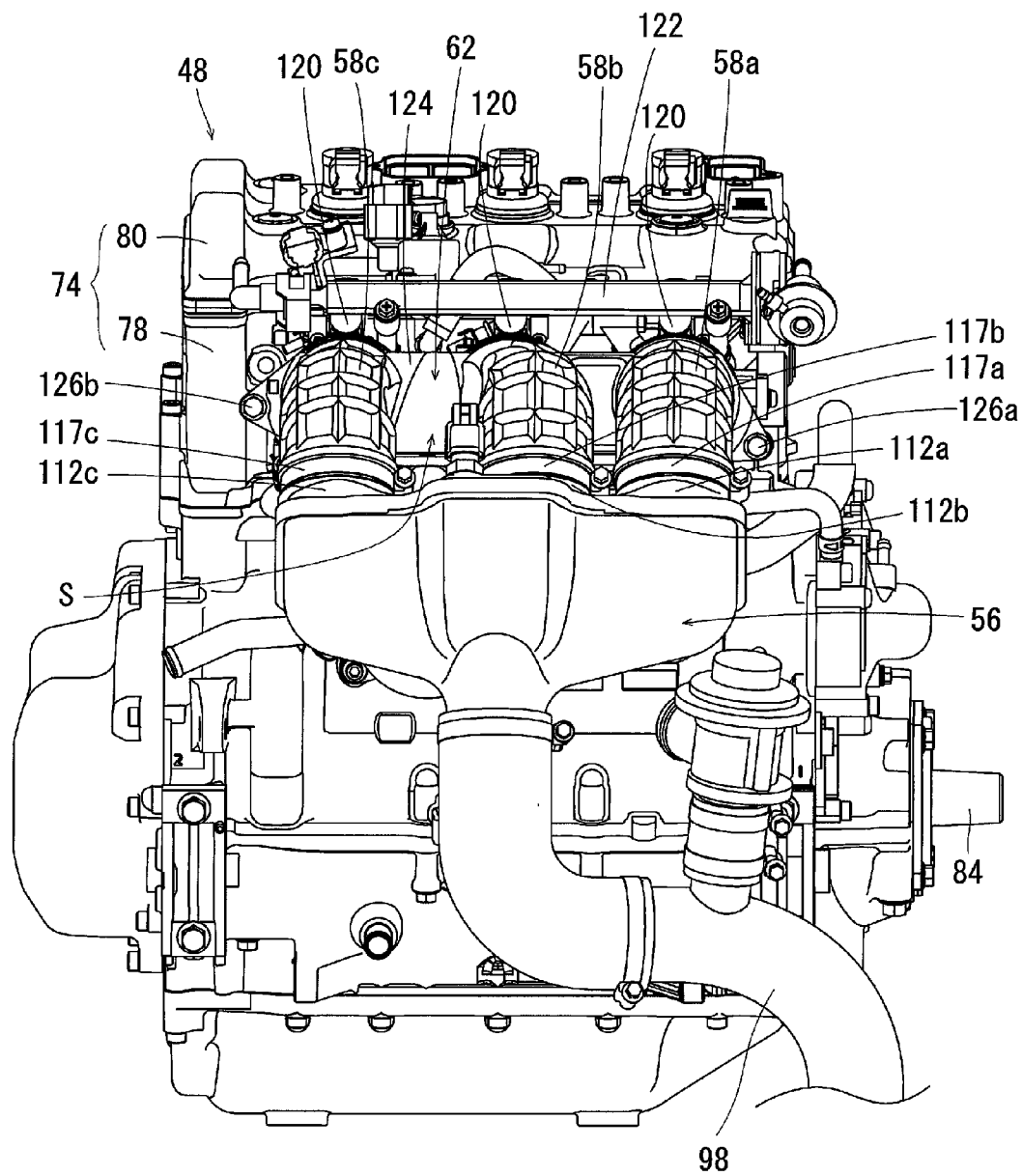
FIG. 9 is a perspective view showing the engine, an intake manifold, and the surroundings thereof.
Figure 10:
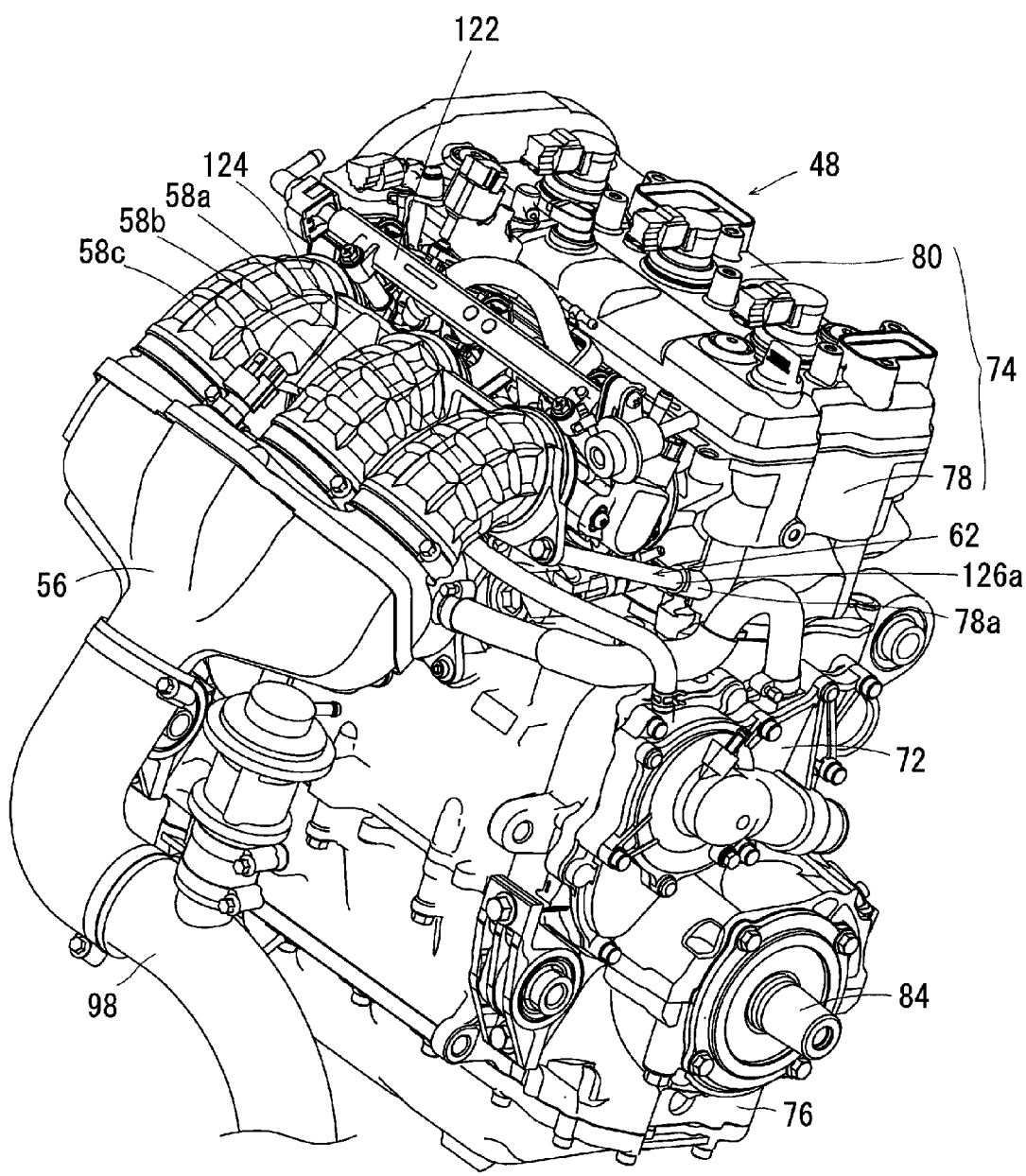
FIG. 10 is a perspective view showing the engine, the intake manifold, and the surroundings thereof.

Referring to FIG. 8 through FIG. 10, the engine 48 preferably is a water-cooled four-stroke parallel three-cylinder engine, for example, and includes a cylinder block 72, an engine head 74, and a crank case 76. The engine head 74 includes a cylinder head 78 and a head cover 80. The cylinder block 72 includes a plurality (for example, three, in the present preferred embodiment) of cylinders 82 arranged in a width direction of the vehicle (see FIG. 8 and FIG. 11). The cylinder head 78 is disposed on top of the cylinder block 72, the head cover 80 is disposed on top of the cylinder head 78, and the crank case 76 is disposed at a bottom of the cylinder block 72. The crank case 76 incorporates a crank shaft 84. The cylinders of the engine 48 preferably have their axes inclined, with an upper side thereof being at a more rearward position than a lower side. In other words, the engine 48 is tilted rearward.

Figure 11:
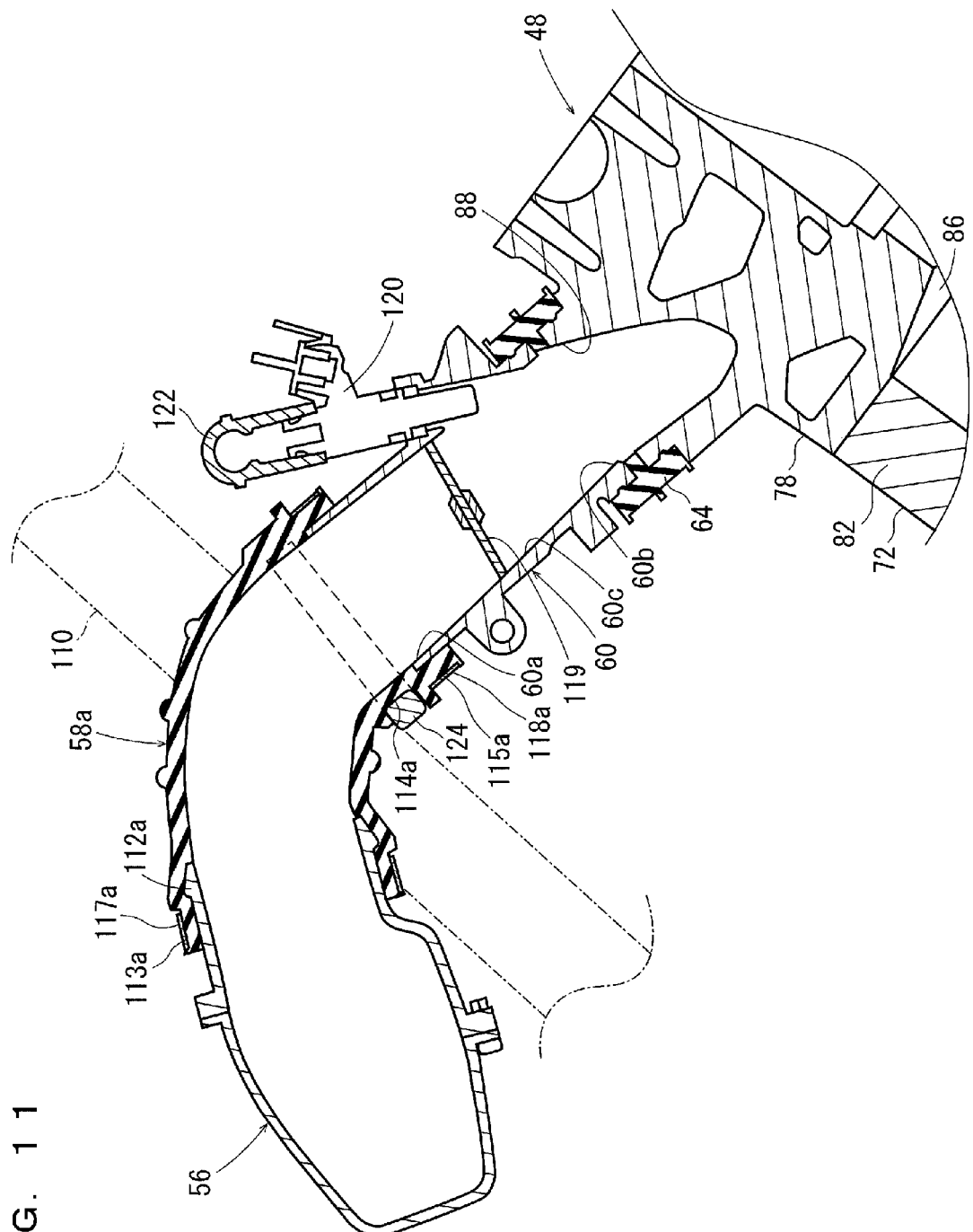
FIG. 11 is an illustrative sectional view showing the intake manifold, a first joint, a throttle body, the engine, etc.

Referring to FIG. 11, the cylinder head 78 includes a plurality of combustion chambers 86 therein. At a front portion of the cylinder head 78, a plurality (for example, three, in the present preferred embodiment) of air intake ports 88 communicate with the combustion chambers 86. At a rear portion of the cylinder head 78, a plurality (for example, three, in the present preferred embodiment) of exhaust ports (not illustrated) communicate with the combustion chambers 86.

Returning to FIG. 3 through FIG. 7, the air cleaner 50 is disposed on a first side (left side, in the present preferred embodiment) of the engine 48. The supercharger 52 is disposed on a second side (right side, in the present preferred embodiment) of the engine 48. The inter cooler 54 is disposed in front of the front frame 28. The intake manifold 56 is disposed at a more rearward position than the inter cooler 54, in front of the engine 48. The supercharger 52 is supplied with air from the air filter 50, and includes a compressor 90 and a turbine 92. The air cleaner 50 and the compressor 90 are connected to each other via an air intake tube 94. The compressor 90 and the inter cooler 54 are connected to each other via an air intake tube 96. The inter cooler 54 and an inlet opening of the intake manifold 56 are connected to each other via an air intake tube 98. The intake manifold 56 includes a plurality (for example, three, in the present preferred embodiment) of outlet openings, each connected to a corresponding one of the throttle bodies 60 via one of the first joints 58a, 58b, 58c. Each throttle body 60 is connected to a corresponding one of the air intake ports 88 of the engine 48 via the second joint 64 (see FIG. 11). Structural details of the intake manifold 56 to the air intake ports 88 of the engine 48 and their surroundings will be described below.

The exhaust manifold 66 is provided behind the engine 48. The muffler 68 is disposed on the second side (right side, in the present preferred embodiment) of the engine 48, at a more outward position than the supercharger 52. The exhaust manifold 66 includes a plurality (three, in the present preferred embodiment) of inlet openings each connected to a corresponding one of the exhaust ports of the engine 48. The exhaust manifold 66 includes an outlet opening, which is connected to the turbine 92 of the supercharger 52 via an exhaust pipe 100. The turbine 92 is connected to the muffler 68 via an exhaust pipe 102.

Figure 3:
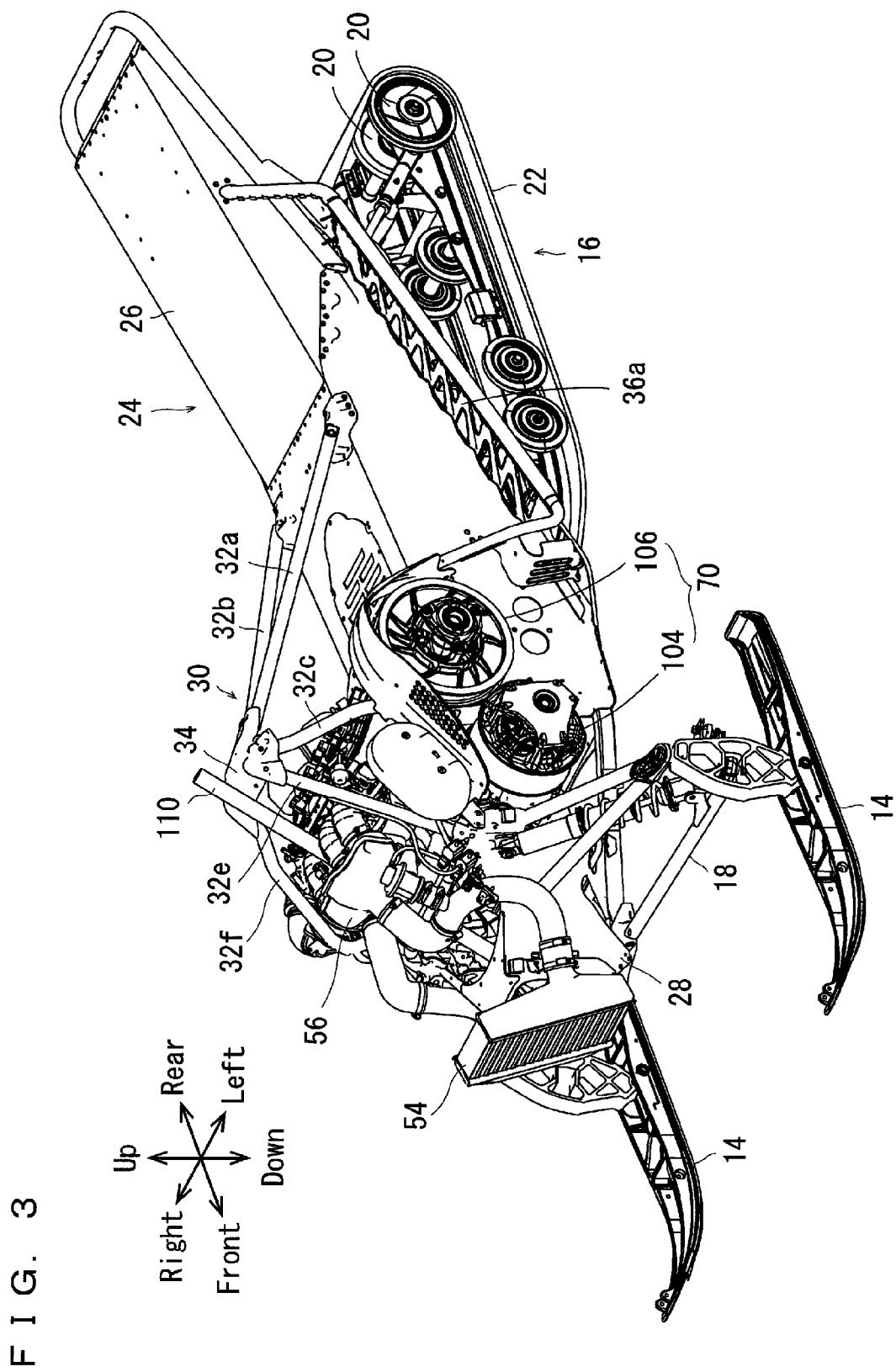
FIG. 3 is a perspective view of the snowmobile with its shrouds removed.
Figure 4:
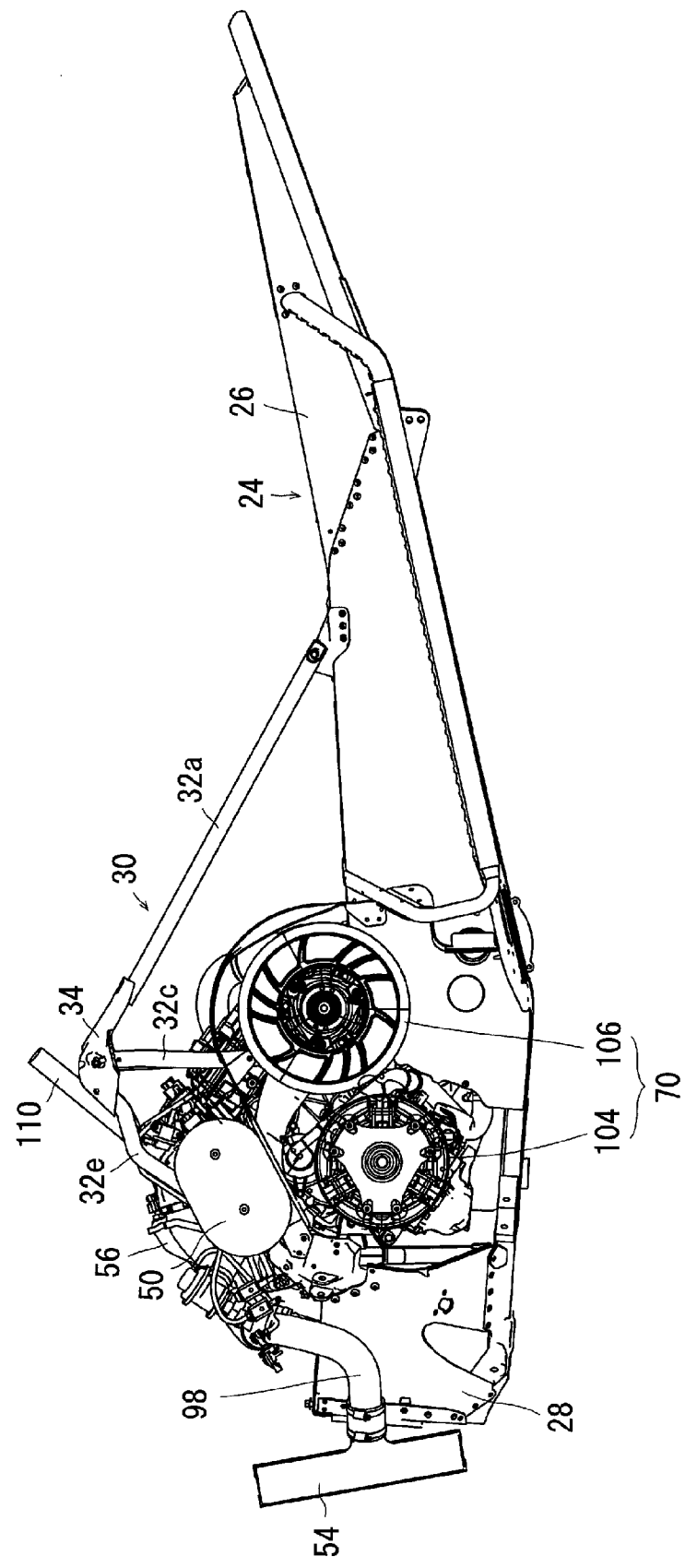
FIG. 4 is a side view of a left side of a main body with the shrouds removed.
Figure 5:
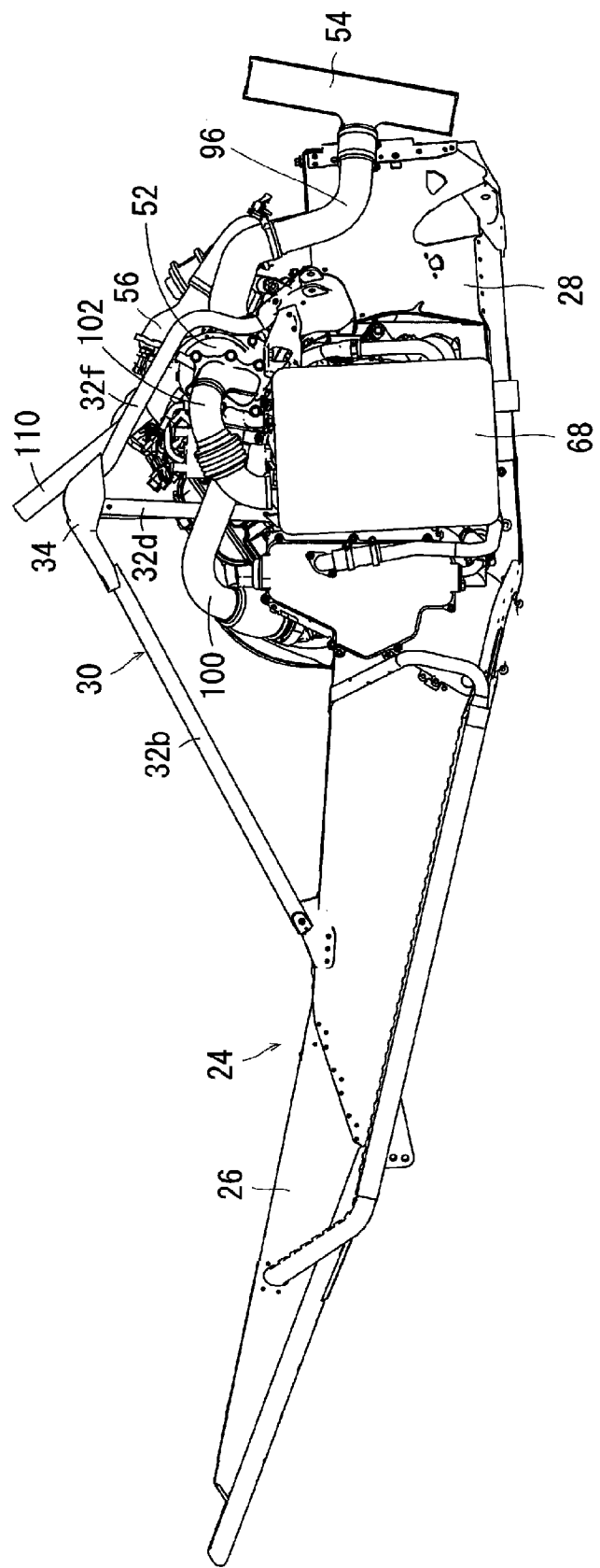
FIG. 5 is a side view of a right side of the main body with the shrouds removed.
Figure 6:
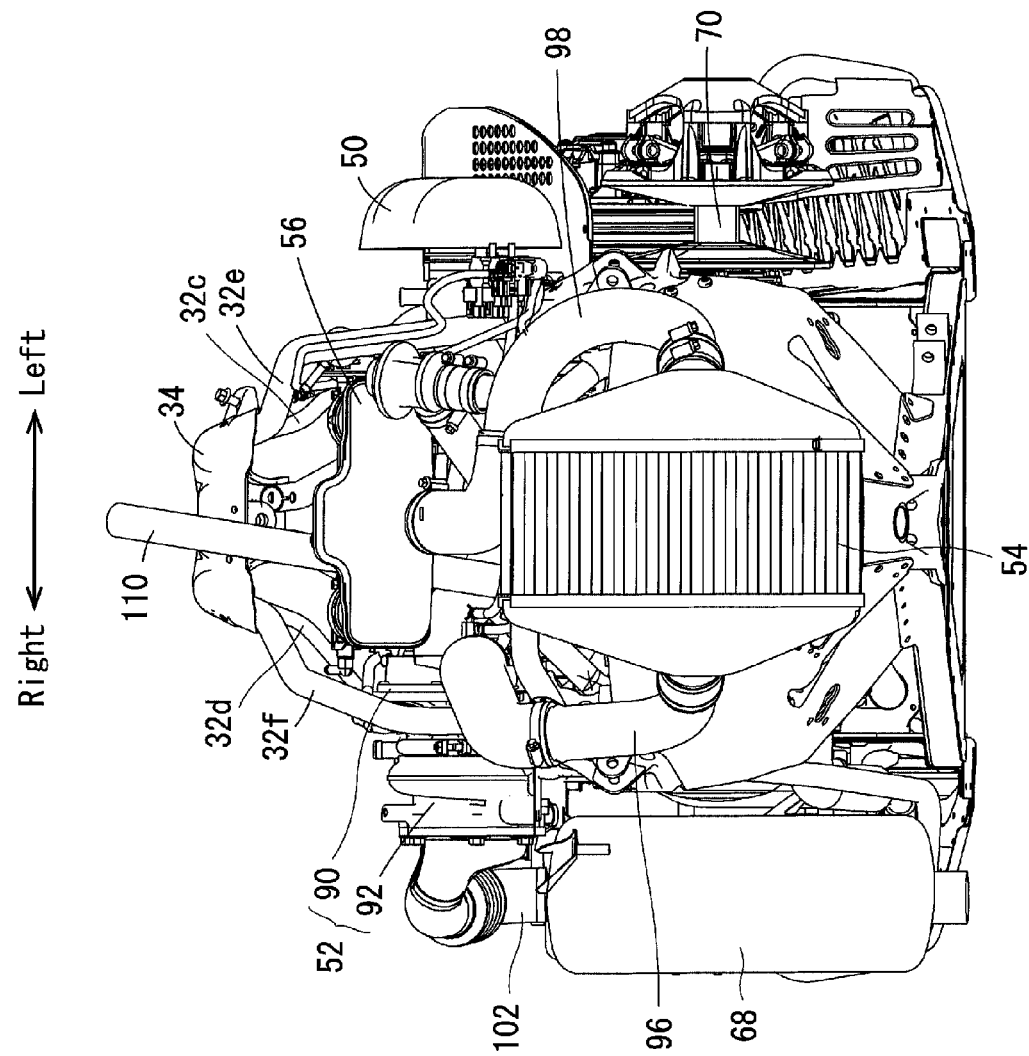
FIG. 6 is a front view of the main body with the shroud removed.

Referring to FIG. 3 and FIG. 4, the CVT 70 includes a drive pulley 104 and a driven pulley 106. The drive pulley 104 is disposed on the first side (left side, in the present preferred embodiment) of the engine 48 and connected to the crank shaft 84 of the engine 48. The driven pulley 106 is disposed behind the drive pulley 104. The drive pulley 104 and the driven pulley 106 are connected with each other by a belt (not illustrated).

Referring to FIG. 1 and FIG. 2, a steering handle 108 and a steering shaft 110 are disposed at a more forward position than the seat 46 in the main body 12. The steering shaft 110 is connected to the steering handle 108 and moves with the steering handle 108. The steering shaft 110 is inserted between the intake manifold 56 and the throttle body 60, and connected to the pair of skis 14 via a connecting portion (not illustrated).

Hereinafter, structural details from the intake manifold 56 to the air intake ports 88 of the engine 48 and their surroundings will be described.

Referring to FIG. 8 through FIG. 11, compressed air from the supercharger 52 is sent to the intake manifold 56, which includes outlet pipe portions 112a, 112b, 112c connected to front end portions of the first joints 58a, 58b, 58c, respectively. The first joints 58a, 58b, 58c correspond, respectively, to each of the cylinders 82 of the engine 48. Each of the first joints 58a, 58b, 58c includes an elastic member such as rubber, is in the shape of a hollow tube, and preferably includes a rubber hose made from a polymer alloy of nitrile rubber and polyvinyl chloride, for example. Referring to FIG. 12, the first joints 58a, 58b, 58c respectively include grooves 113a, 113b, 113c provided at a first end region of an outer circumferential surface thereof; and grooves 114a, 114b, 114c and grooves 115a, 115b, 115c provided at a second end region of the outer circumferential surface thereof. Respectively, the grooves 113a, 113b, 113c are preferably annular, and extend in the circumferential direction along the outer circumferential surfaces of the first joints 58a, 58b, 58c, at end regions which are closer to the intake manifold 56. Respectively, the grooves 114a, 114b, 114c are preferably C-shaped or substantially C-shaped, and extend in a circumferential direction along the outer circumferential surfaces of the first joints 58a, 58b, 58c, at locations closer to the throttle bodies 60. Respectively, the grooves 115a, 115b, 115c are preferably annular, and extend in the circumferential direction along the outer circumferential surfaces of the first joints 58a, 58b, 58c, at end regions (closer to the ends than the grooves 114a, 114b, 114c are) at a side closer to the throttle bodies 60. Referring to FIG. 14, the first joints 58b and 58c are adjacent to each other with a gap in between for the steering shaft 110 to be inserted therethrough. The gap is greater than a gap between the other two mutually adjacent first joints 58a and 58b. Referring to FIG. 12 through FIG. 14, the mutually adjacent first joints 58b, 58c, and an engaging member 124 (to be described below) of the restrictor 62 are provided with recesses 116a, 116b, 116c in their respective regions facing the steering shaft 110. The first joints 58a, 58b, 58c have their respective rear end portions connected to a corresponding one of the throttle bodies 60. Therefore, the first joints 58a, 58b, 58c are disposed behind the intake manifold 56, in front of the throttle bodies 60, and connect the intake manifold 56 to the throttle bodies 60 to provide communication therebetween. Referring also to FIG. 11, bands 117a, 117b, 117c are attached to the grooves 113a, 113b, 113c respectively, to prevent air from leaking between the intake manifold 56 and the first joints 58a, 58b, 58c. Bands 118a, 118b, 118c are attached to the grooves 115a, 115b, 115c respectively, to prevent air from leaking between the first joints 58a, 58b, 58c and the throttle bodies 60.

Referring to FIG. 8 and FIG. 11, the throttle bodies 60 are disposed in front of the engine 48 in a one-to-one relationship with the cylinders 82. Each throttle body 60 preferably is a cylindrical member having an opening at each end. Each throttle body 60 includes an air inlet opening 60a at its one end; an air outlet opening 60b at the other end; and an air intake passage 60c in its inside. Each air inlet opening 60a is connected to a rear end portion of one of the first joints 58a, 58b, 58c. Each air outlet opening 60b is connected to a corresponding one of the air intake ports 88 of the engine 48 via a corresponding one of the second joints 64. In other words, the throttle bodies 60 and the cylinder head 78 are connected to each other by the second joints 64. Preferably, the second joint 64 includes an elastic member such as rubber. Metal rings (not illustrated) are attached to an outer circumferential surface of the second joint 64 to fix the elastic member to the throttle body 60 and the cylinder head 78. Air from the intake manifold 56 passes through the throttle bodies 60 and is supplied to the cylinder head 78. A throttle valve 119 is provided in the air intake passage 60c inside the throttle body 60. The throttle valve 119, which is variably adjustable between its fully opened position and fully closed position, adjusts the amount of air supplied to the engine 48.

Referring to FIG. 9 and FIG. 11, fuel injection valves 120 are disposed above the throttle bodies 60. The fuel injection valves 120 have their tip portions inserted into the air intake passages 60c inside the throttle bodies 60. The fuel injection valves 120 are connected to a common fuel pipe 122. The fuel pipe 122 is connected to a fuel pump (not illustrated). The fuel pump supplies fuel from inside the fuel tank 47, through the fuel pipe 122, to each fuel injection valve 120. Each fuel injection valve 120 supplies the fuel to the air intake port 88 via the throttle body 60. In the present preferred embodiment, for example, so called electronic throttle control is used.

Figure 13A:
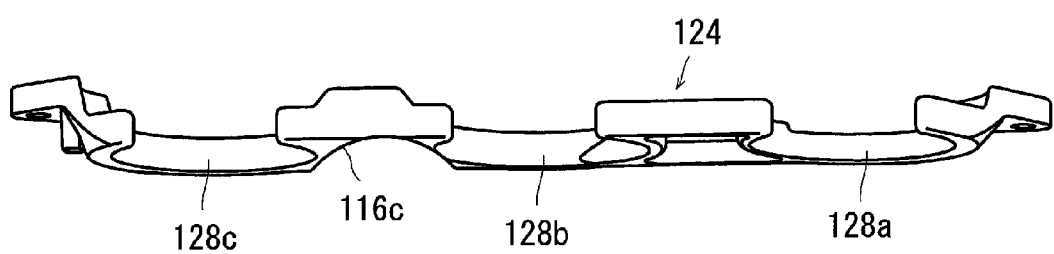
Figure 13B:
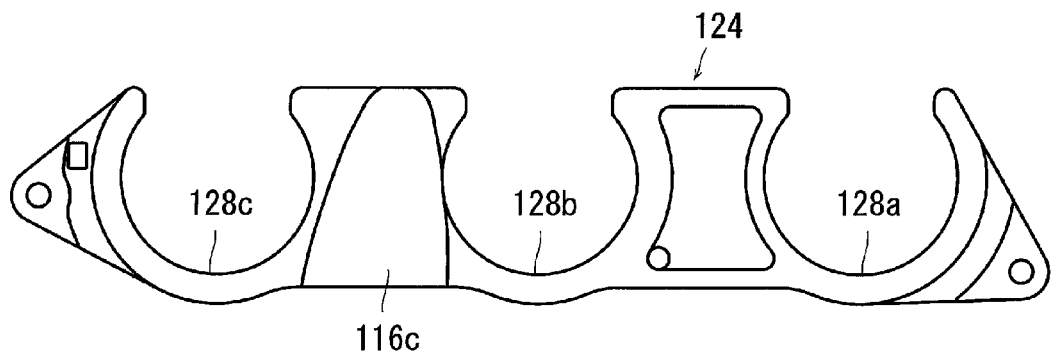

Referring to FIG. 9 through FIG. 11 and FIG. 14, the engine head 74 and the first joints 58a, 58b, 58c are connected by the restrictor 62 so as to restrict relative movement of the first joints 58a, 58b, 58c to the engine head 74. The restrictor 62 includes an engaging member 124 which fits into the grooves 114a, 114b, 114c (see FIG. 12) and is fixed to the first joints 58a, 58b, 58c; and connectors 126a, 126b which connect the engaging member 124 and the engine head 74 to each other. Referring also to FIG. 13A and FIG. 13B, the engaging member 124 preferably includes C-shaped or substantially C-shaped engaging member portions 128a, 128b, 128c that fit into the grooves 114a, 114b, 114c, so as to connect a plurality (for example, three, in the present preferred embodiment) of the first joints 58a, 58b, 58c to each other. Referring also to FIG. 8, the connectors 126a, 126b are disposed on two outer sides of the plurality of cylinders 82. In other words, the connectors 126a, 126b are to the left and to the right of the plurality of cylinders 82 in the width direction of the snowmobile 10. The connector 126a is near the first joint 58a, and includes a collar 130a which is located between the engaging member 124 and a boss 78a on the cylinder head 78 of the engine head 74; and a bolt 132a which penetrates the collar 130a and connects the engaging member 124 and the cylinder head 78 of the engine head 74 to each other. Likewise, the connector 126b is near the first joint 58c, and includes a collar 130b which is located between the engaging member 124 and a boss (not illustrated) on the cylinder head 78 of the engine head 74; and a bolt 132b which penetrates the collar 130b and connects the engaging member 124 and the cylinder head 78 of the engine head 74 to each other. During assembly, for example, the first joints 58a, 58b, 58c are fitted to the engaging member 124; and while the throttle bodies 60 are sandwiched by the first joints 58a, 58b, 58c and the engine head 74, the engaging member 124 is fixed to the engine head 74 with the connectors 126a, 126b.

It should be noted here that FIG. 11 shows a structure from the outlet pipe portion 112a of the intake manifold 56 to the corresponding cylinder 82 of the engine 48. A structure from the outlet pipe portion 112b (see FIG. 9) of the intake manifold 56 to the corresponding cylinder 82 of the engine 48; and a structure from the outlet pipe portion 112c (see FIG. 9) of the intake manifold 56 to the corresponding cylinder 82 of the engine 48 are similar to the structure from the outlet pipe portion 112a of the intake manifold 56 to the corresponding cylinder 82 of the engine 48, and are understood easily by referring to FIG. 11.

Referring to FIG. 8, FIG. 9 and FIG. 14, the steering shaft 110 is inserted between the two mutually adjacent first joints 58b and 58c, or more specifically, inserted through a space S which is surrounded by the first joints 58b, 58c, the engaging member 124 of the restrictor 62, and the intake manifold 56.

According to the snowmobile 10 described above, the restrictor 62 restricts movement of the first joints 58a, 58b, 58c and, therefore, even if an air intake pressure on the upstream side of the throttle bodies 60 becomes high, it is possible to prevent the first joints 58a, 58b, 58c, which are members on the upstream side of the throttle bodies 60, from detaching from the throttle bodies 60. Since it is possible to prevent the first joints 58a, 58b, 58c from detaching, there is no need to use throttle bodies having a special structure, i.e., conventional throttle bodies for a naturally aspirated engine which is not equipped with a supercharger 52 are easily used for an engine 48 which is equipped with a supercharger 52.

Since the first joints 58a, 58b, 58c include elastic members, even if the first joints 58a, 58b, 58c are subjected to an external force, it is possible to absorb the external force, and it is possible to more reliably prevent the first joints 58a, 58b, 58c from detaching. In other words, an arrangement that is virtually equivalent to a conventional intake manifold that is partially substituted with a rubber hose is used. This enables more reliable assembling of members, which are on the upstream side of the throttle bodies 60, to the throttle bodies 60.

The restrictor 62 includes the engaging member 124 which fits into the grooves 114a, 114b, 114c; and the connectors 126a, 126b which connect the engaging member 124 and the engine head 74 to each other. In this way, the restrictor 62 which restricts axial movement of the first joints 58a, 58b, 58c is easily made. Also, the connectors 126a, 126b connect the engaging member 124 and the engine head 74 in such a manner that the throttle bodies 60 are sandwiched by the engaging member 124 which is fitted in the grooves 114a, 114b, 114c of the first joints 58a, 58b, 58c, and the engine head 74. This makes it possible to fix the throttle bodies 60 to prevent the throttle bodies 60 from detaching due to a high pressure.

The grooves 114a, 114b, 114c are preferably C-shaped or substantially C-shaped, and the engaging member 124 preferably includes C-shaped or substantially C-shaped engaging member portions 128a, 128b, 128c, i.e., the engaging member portions 128a, 128b, 128c which are partially open while covering a portion of the first joints 58a, 58b, 58c in a circumferential direction. This makes it possible to easily attach/detach the engaging member 124 to/from the grooves 114a, 114b, 114c.

The collars 130a, 130b define and function as spacers. This makes it possible to maintain a constant distance between the engaging member 124 and the engine head 74 and to allow easy connection between the engaging member 124 and the engine head 74 using the bolts 132a, 132b, for example.

The engaging member 124 connects a plurality of the first joints 58a, 58b, 58c. In other words, one engaging member 124 is fitted into the grooves 114a, 114b, 114c of a plurality of first joints 58a, 58b, 58c. Therefore, only one engaging member 124 is needed even if there is a plurality of the first joints 58a, 58b, 58c. Also, by connecting a plurality of the first joints 58a, 58b, 58c using one engaging member 124, it becomes possible to maintain a consistent positional relationship of the first joints 58a, 58b, 58c.

The connectors 130a, 130b are on one and the other outer sides of the plurality of cylinders 82 as a whole, and the connectors 130a, 130b connect the engaging member 124 and the engine head 74 to each other. In other words, the engine head 74 and the engaging member 124, which defines and functions as a bracket, are connected at two locations. Therefore, the restrictor 62 restricts movement of the first joints 58a, 58b, 58c more reliably, making it possible to prevent the first joints 58a, 58b, 58c from detaching more reliably.

It is possible to fix the cylinder head 78 and the throttle bodies 60 by the second joints 64 which are made of an elastic member, for example.

Since the second joint 64 includes an elastic member, it is possible to fix the cylinder head 78 and the throttle body 60 more reliably.

The intake manifold 56 and the throttle bodies 60 are connected to each other by the first joints 58a, 58b, 58c. This makes it possible to provide a space between two mutually adjacent first joints 58b, 58c to insert the steering shaft 110 therein, making it possible to attach the steering shaft 110 even in a design that the steering shaft 110 is located between the intake manifold 56 and the throttle bodies 60.

Since the first joints 58a, 58b, 58c include elastic members, the first joints 58a, 58b, 58c have increased freedom in their shape. This makes it easier to provide a space between two mutually adjacent first joints 58b, 58c to insert the steering shaft 110 therein, making it easier to attach the steering shaft 110. Particularly in cases where the first joints 58a, 58b, 58c are made from a polymer alloy of nitrile rubber and polyvinyl chloride, for example, there is a large degree of freedom in their shape and it becomes easy to provide a clearance between the first joints 58b, 58c and the steering shaft 110.

The steering shaft 110 is inserted between the first joints 58b, 58c which have a greater distance therebetween than between the other two mutually adjacent first joints 58a, 58b. Therefore, the arrangement makes it easy to insert the steering shaft 110 between the two mutually adjacent first joints 58b, 58c, and the location to insert the steering shaft 110 is easily recognized.

The first joints 58b, 58c and the engaging member 124 are provided with the recesses 116a, 116b, 116c respectively. This makes it possible to provide an arrangement in which the first joints 58b, 58c and the engaging member 124 are spaced apart from the steering shaft 110. In other words, it is possible to smoothly insert the steering shaft 110 into a space S which is defined by the intake manifold 56, the first joints 58b, 58c, and the engaging member 124.

According to preferred embodiments of the present invention, the restrictor 62 restricts movement of the first joints 58a, 58b, 58c, and it is possible to prevent the first joints 58a, 58b, 58c from detaching. Therefore, throttle bodies for non-supercharged engines are used in common for engines equipped with superchargers. Therefore, the preferred embodiments of the present invention are suitable for a snowmobile 10 which is equipped with a supercharger 52, for example.

It should be noted here that the grooves 114a, 114b, 114c are not limited to be C-shaped or substantially C-shaped; they may be annular, for example.

The engine in the present invention may include a single cylinder or multiple cylinders. Preferably, however, the engine includes at least three cylinders.

Throttle control is not limited to electronic throttle control; a mechanical throttle control may be used instead.

The preferred embodiments of the present invention are not limited to snowmobiles but are applicable to any type of vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
   an engine including an engine head including a cylinder head and a head cover disposed on the cylinder head;
   a throttle body that supplies air to the cylinder head;
   a supercharger;
   an intake manifold that is supplied with compressed air from the supercharger;
   a first joint that connects the intake manifold and the throttle body to each other; and
   a restrictor that connects the engine head and the first joint to restrict relative movement of the first joint with respect to the engine head; wherein
   the throttle body and the intake manifold are spaced apart from each other with the first joint located therebetween.

2. The vehicle according to claim 1, further comprising a second joint that connects the cylinder head and the throttle body to each other and includes an elastic member.

3. The vehicle according to claim 1, wherein the vehicle is a snowmobile.

4. A vehicle comprising:
   an engine including an engine head including a cylinder head and a head cover disposed on the cylinder head;
   a throttle body that supplies air to the cylinder head;
   a supercharger;
   an intake manifold that is supplied with compressed air from the supercharger;
   a first joint that connects the intake manifold and the throttle body to each other; and
   a restrictor that connects the engine head and the first joint to restrict relative movement of the first joint with respect to the engine head; wherein
   the first joint includes a groove in an outer circumferential surface of the first joint; and
   the restrictor includes an engaging member that fits into the groove, and a connector that connects the engaging member and the engine head to each other.

5. The vehicle according to claim 4, wherein the groove is C-shaped or substantially C-shaped in a circumferential direction of the outer circumferential surface of the first joint; and
   the engaging member includes a C-shaped or substantially C-shaped engaging member portion that fits into the groove.

6. The vehicle according to claim 4, wherein the connector includes a collar between the engaging member and the engine head, and a bolt inserted through the collar to connect the engaging member and the engine head to each other.

7. The vehicle according to claim 4, wherein
the engine includes a plurality of cylinders;
the first joint includes a plurality of first joints;
the plurality of first joints are provided respectively for the plurality of cylinders; and
the engaging member connects the plurality of first joints together.

8. The vehicle according to claim 7, wherein
the connector includes a first connector and a second connector; and
the first connector and the second connector are respectively provided on each of two laterally outer sides of the plurality of cylinders.

9. A vehicle comprising:
an engine including an engine head including a cylinder head and a head cover disposed on the cylinder head;
a throttle body that supplies air to the cylinder head;
a supercharger;
an intake manifold that is supplied with compressed air from the supercharger;
a first joint that connects the intake manifold and the throttle body to each other; and
a restrictor that connects the engine head and the first joint to restrict relative movement of the first joint with respect to the engine head; wherein
the engine includes a plurality of cylinders;
the first joint includes a plurality of first joints;
the plurality of first joints are provided respectively for the plurality of cylinders; and
a steering shaft is inserted between two mutually adjacent ones of the plurality of first joints.

10. The vehicle according to claim 9, wherein each of the plurality of first joints includes an elastic member.

11. The vehicle according to claim 9, wherein
the engine includes at least three cylinders; and
the two mutually adjacent ones of the plurality of first joints between which the steering shaft is inserted are spaced by a distance from each other which is greater than a distance between another two mutually adjacent ones of the plurality of first joints.

12. A vehicle comprising:
an engine including an engine head including a cylinder head and a head cover disposed on the cylinder head;
a throttle body that supplies air to the cylinder head;
a supercharger;
an intake manifold that is supplied with compressed air from the supercharger;
a first joint that is tubular, made of an elastic material, and connects the intake manifold and the throttle body to each other to provide communication therebetween; and
a restrictor that connects the engine head and the first joint to restrict relative movement of the first joint with respect to the engine head.

13. The vehicle according to claim 12, further comprising a second joint that connects the cylinder head and the throttle body to each other and includes an elastic member.

14. The vehicle according to claim 12, wherein the vehicle is a snowmobile.

* * * * *